US010569280B2

(12) United States Patent
Busenhart et al.

(10) Patent No.: US 10,569,280 B2
(45) Date of Patent: Feb. 25, 2020

(54) ROLLER PAIR, MEASURING DEVICE, PRODUCT-PROCESSING INSTALLATION, AND METHOD

(71) Applicant: BÜHLER AG, Uzwil (CH)

(72) Inventors: Peter Busenhart, Wiesendangen (CH); Jason Burwell, St. Gallen (CH); Mukul Agarwal, Zürich (CH); Emanuel Reiter, Uzwil (CH)

(73) Assignee: BÜHLER AG, Uzwil (CH)

( * ) Notice: Subject to any disclaimer, the term of this patent is extended or adjusted under 35 U.S.C. 154(b) by 1010 days.

(21) Appl. No.: 14/895,525

(22) PCT Filed: Jun. 3, 2014

(86) PCT No.: PCT/EP2014/061475
§ 371 (c)(1),
(2) Date: Dec. 3, 2015

(87) PCT Pub. No.: WO2014/195309
PCT Pub. Date: Dec. 11, 2014

(65) Prior Publication Data
US 2016/0107162 A1 Apr. 21, 2016

(30) Foreign Application Priority Data
Jun. 3, 2013 (EP) .................................... 13170302

(51) Int. Cl.
B02C 4/02 (2006.01)
B02C 4/28 (2006.01)
(Continued)

(52) U.S. Cl.
CPC ................ B02C 25/00 (2013.01); B02C 4/02 (2013.01); B02C 4/28 (2013.01); B02C 4/32 (2013.01);
(Continued)

(58) Field of Classification Search
CPC ......... B02C 25/00; B02C 23/00; B02C 23/04; B02C 4/00; B02C 4/02; B02C 4/08;
(Continued)

(56) References Cited

U.S. PATENT DOCUMENTS 4,820,980 A 4/1989 Dodson-Edgars
4,904,091 A * 2/1990 Ward ....................... G01K 1/14
136/230

(Continued)

FOREIGN PATENT DOCUMENTS

CH 654 223 A5 2/1986
CN 201 072 354 Y 6/2008
(Continued)

OTHER PUBLICATIONS

Chinese Office Action Corresponding to 201480043841.9 dated Feb. 4, 2017 18 Pages.

(Continued)

Primary Examiner — Shelley M Self
Assistant Examiner — Katie L. Parr
(74) Attorney, Agent, or Firm — Davis & Bujold PLLC; Michael J. Bujold

(57) ABSTRACT

Roller pairs for processing a product, containing two grinding rollers, wherein at least one roller contains at least one sensor for obtaining measured values that characterize a state of at least one of the rollers, in particular a state of a circumferential surface. The sensor has a data connection to a data transmitter designed to transmit the measured values to a data receiver in an contact-free manner. Additionally, a measuring device for insertion into a receiving opening of a roller body of a roller of a roller pair, a product-processing installation, in particular a grinding installation containing at least one roller pair, a method of operating a product- (Continued)

processing installation, and a method of converting and/or upgrading at least one roller body are disclosed.

17 Claims, 5 Drawing Sheets

(51) Int. Cl.
  *G01M 99/00* (2011.01)
  *B02C 25/00* (2006.01)
  *B02C 4/32* (2006.01)
(52) U.S. Cl.
  CPC ......... *G01M 99/00* (2013.01); *B02C 2210/01* (2013.01)
(58) Field of Classification Search
  CPC .. B30B 3/00; B30B 3/04; B30B 15/00; B30B 15/0094; F16H 2305/106; F16H 2057/018; F16H 57/01; F16H 2605/106; G01L 5/0085; G01L 5/047
  USPC ............................. 241/221, 227–236, 33–37
  See application file for complete search history.

(56) References Cited

U.S. PATENT DOCUMENTS

| | | | |
|---|---|---|---|
| 5,271,319 A | 12/1993 | Plagemann | |
| 5,429,312 A | 7/1995 | Ohno et al. | |
| 6,318,147 B1 | 11/2001 | Steinrück et al. | |
| 6,354,013 B1* | 3/2002 | Mucke | B21B 38/02 33/501.02 |
| 7,172,144 B1 | 2/2007 | Slater et al. | |
| 7,182,283 B1 | 2/2007 | Santucci | |
| 7,185,537 B2* | 3/2007 | Muhs | D21F 3/04 73/159 |
| 7,572,214 B2 | 8/2009 | Gustafson | |
| 7,963,180 B2 | 6/2011 | Moore et al. | |
| 8,475,347 B2* | 7/2013 | Gustafson | D21F 3/06 29/895.2 |
| 2006/0090574 A1* | 5/2006 | Moore | G01L 5/0085 73/862.55 |
| 2007/0090828 A1 | 4/2007 | Akerblom | |
| 2008/0156909 A1 | 7/2008 | Schuth et al. | |
| 2009/0006028 A1 | 1/2009 | Sugawara et al. | |
| 2009/0008486 A1* | 1/2009 | Torres | B02C 2/047 241/33 |
| 2009/0027202 A1 | 1/2009 | Copeland et al. | |
| 2011/0101139 A1 | 5/2011 | Inoue et al. | |
| 2012/0223167 A1* | 9/2012 | Butler | B29B 17/0404 241/33 |
| 2014/0374460 A1* | 12/2014 | Breineder | D21F 3/06 226/45 |
| 2015/0253131 A1* | 9/2015 | Webster | G01B 11/25 241/101.3 |

FOREIGN PATENT DOCUMENTS

| | | |
|---|---|---|
| DE | 42 22 085 A1 | 1/1994 |
| DE | 44 04 638 A1 | 8/1994 |
| DE | 198 19 614 A1 | 11/1999 |
| DE | 102 26 411 A1 | 12/2003 |
| EP | 1 132 518 A2 | 9/2001 |
| GB | 2 074 761 A | 11/1981 |
| GB | 2 074 761 B1 | 11/1981 |
| JP | S49-50558 | 5/1974 |
| JP | H02501089 A | 4/1990 |
| JP | H04-22041 | 2/1992 |
| JP | H066240 B2 | 1/1994 |
| JP | H06-182240 | 7/1994 |
| JP | 2006523137 A | 10/2006 |
| JP | 2008536782 A | 9/2008 |
| JP | 2009534169 A | 9/2009 |
| JP | 2010534998 A | 11/2010 |
| WO | 2004/004907 A1 | 1/2004 |
| WO | 2004/004908 A1 | 1/2004 |
| WO | 2006049158 A1 | 5/2006 |
| WO | 2007/025395 A1 | 3/2007 |
| WO | 2007/101319 A1 | 9/2007 |
| WO | 2007121596 A2 | 11/2007 |

OTHER PUBLICATIONS

Japanese Office Action issued in corresponding Japanese Patent Application No. 2016-517269 dated Mar. 6, 2017.
International Preliminary Report on Patentability Corresponding to PCT/EP2014/061475 dated Jun. 3, 2014.
Japanese Office Action issued in corresponding Japanese Patent Application No. 2016-517269 dated Feb. 5, 2018.
Korean Office Action issued in corresponding Korean Patent Application No. 9-5-2016-092144980 dated Dec. 21, 2016. 7 Pages.
Indian Office Action Corresponding to 11972/DELNP/2015 dated Jul. 9, 2019.

* cited by examiner

ROLLER PAIR, MEASURING DEVICE, PRODUCT-PROCESSING INSTALLATION, AND METHOD

FIELD OF THE INVENTION

The present invention relates to roller pairs, in particular grinding roller pairs, measuring devices for in particular releasable insertion into a receiving opening of a roller body of a roller of a roller pair, in particular of a grinding roller of a grinding roller pair, product-processing installations containing at least one roller pair, in particular grinding installations containing at least one grinding roller pair, a method for operating a product-processing installation, in particular a grinding installation, and a method for converting and/or upgrading a roller body of a roller pair, in particular of a grinding roller pair.

BACKGROUND OF THE INVENTION

Grinding rollers, such as are used in flour milling for example, require constant monitoring. For example, it can happen that a so-called dry run occasionally occurs in which adjacent grinding rollers touch each other and the drive power of the motor is converted in an uncontrolled manner into heat. If this state lasts for too long, the temperature of the grinding roller may increase to a critical range and possibly cause a fire.

To prevent this, it is already known to monitor the temperature of a grinding roller with the aid of one or more sensors and to output an alarm when a possible ignition temperature is reached. For this purpose, optical systems are often used for detecting the circumferential surface of the grinding roller. However, a problem with this is that these optical systems are located in the product space through which the grindable material also flows. For this reason, such optical systems are extremely susceptible to soiling.

It is known from DE 102 26 411 A1 to measure the temperature of the circumferential surface of a grinding roller with the aid of temperature sensors in a contact-free manner. On account of the distance between the sensor and the circumferential surface of the grinding roller, the actual temperature of the circumferential surface can in part differ considerably from the measured temperature. These deviations then have to be taken into consideration in the evaluation based on purely experimental values, which is long-winded and also prone to error. Moreover, DE 198 19 614 A1 discloses temperature sensors arranged at a distance from the grinding rollers.

It is likewise important to monitor the wear of the rollers. For this purpose, DE 42 22 085 A1 discloses devices for measuring the surface condition of a grinding roller. However, these devices are likewise arranged outside the circumferential surface of the grinding roller and therefore have the disadvantages already described above.

A device and a method are likewise known with which wear can be measured on corrugated rollers. However, the measurement is possible only when the grinding rollers have been stopped. Although this measurement is precise, the grinding installation always has to be brought to a standstill for this purpose.

Furthermore, pressure sensors are also known with which the contact pressure between two adjacent grinding rollers can be measured. Moreover, vibration sensors for grinding rollers are known, for example from WO 2007/025395 A1. All of these sensors are likewise arranged outside the grinding rollers.

SUMMARY OF THE INVENTION

It is an object of the present invention to overcome the disadvantages known from the prior art. In particular, the aim is to make available a roller pair, in particular a grinding roller pair, and a product-processing installation, in particular a grinding installation for the grinding of grindable material, with which a state of at least one roller or of both rollers of a roller pair, in particular of at least one grinding roller or both grinding rollers of a grinding roller pair, can be determined with greater accuracy and which are also less susceptible to soiling. In this way, at least in some embodiments, the operational safety is to be increased, and it should be possible to draw conclusions regarding the performance of a processing operation, in particular a grinding process.

This object is achieved, on the one hand, by a roller pair for processing a product, which contains two rollers, wherein at least one of the rollers, in particular both of the rollers contain(s) at least one sensor. It can in particular be a grinding roller pair, which contains two grinding rollers, wherein at least one of the grinding rollers, in particular both grinding rollers, contain(s) at least one sensor.

DETAILED DESCRIPTION OF THE INVENTION

In light of the prior art, a person skilled in the art is prompted to arrange sensors only outside a roller of a roller pair that processes bulk material or mixtures and will not even consider carrying out tests to determine whether it would in fact be possible, against all implicit expectations of the prior art, to achieve functionality with a sensor system inside the circumferential surface of the roller. A person skilled in the art would not consider any of the possible tests with a roller of a roller pair that processes bulk material or mixtures and that contains a sensor, in part because of the extreme forces, pressures, temperatures and dust conditions in the environment of a roller pair that processes bulk material or mixtures and the conventional methodology in the processing of bulk material. In order to arrive at this inventive concept in the first place, the inventors therefore had to overcome serious, real and/or alleged technical obstacles and/or prejudices.

Within the meaning of the present invention, a "product" is understood as a bulk material or a mass. Within the meaning of the present invention, a "bulk material" is understood as a product which is in the form of powder, granules or pellets and which is used in the bulk material processing industry, i.e. in the processing of cereal, cereal milling products and cereal end products in the milling industry (in particular the grinding of common wheat, durum, rye, maize and/or barley) or in the special milling industry (in particular the shelling and/or grinding of soya, buckwheat, barley, spelt, millet/sorghum, pseudo-cereals and/or pulses), in the production of feed for animals and pets, fish and crustaceans, in the processing of oilseeds, the processing of biomass and the production of energy pellets, in industrial malting and malt-handling installations; the processing of cocoa beans, nuts and coffee beans, the production of fertilizers, in the pharmaceutical industry or in solid-state chemistry.

Within the meaning of the present invention, a "mass" is understood as a food mass, for example a chocolate mass or a sugar mass, or a printing ink, a coating, an electronic material or a chemical, in particular a fine chemical.

Within the meaning of the present invention, "processing a product" is understood as the following:

grinding, comminution and/or flaking of bulk material, in particular cereal, cereal milling products and cereal end products in the milling industry or special milling industry, as mentioned above, for which purpose it is possible to use as roller pairs, for example, the pairs of grinding rollers or flaking rollers described in more detail below;

refining of masses, in particular of food masses such as chocolate masses or sugar masses, for which purpose it is possible, for example, to use pairs of fine rollers;

wet grinding and/or dispersing, in particular of printing inks, coatings, electronic materials or chemicals, in particular fine chemicals.

Grinding rollers within the meaning of the present invention are designed to grind granular grindable material, which is usually guided between a grinding roller pair of two grinding rollers. Grinding rollers, in particular the grinding rollers of the grinding roller pairs according to the invention, usually have a substantially non-elastic surface (in particular on their circumferential surface) which, for this purpose, can contain or be made of metal for example, such as steel, in particular stainless steel. Between the grinding rollers of the grinding roller pair, there is usually a relatively fixed and often hydraulically regulated grinding gap. In many grinding installations, the material to be ground is guided substantially vertically downward through such a grinding gap. Moreover, in many grinding installations, the material to be ground is delivered to the grinding rollers of a grinding roller pair by means of its force of gravity, and this delivery can optionally be assisted pneumatically. The material to be ground is usually granular and moves as a fluid stream through the grinding gap. In terms of these properties, a grinding roller (in particular a grinding roller of a grinding roller pair according to the invention) and a grinding installation containing at least one such grinding roller differ, for example, from many rollers that are usually employed to transport paper.

At least one roller, in particular both rollers, of the grinding roller pair, in particular at least one grinding roller, in particular both grinding rollers of the grinding roller pair, can be designed, for example, as a smooth roller or as a corrugated roller or as a roller body with screwed-on plates. Smooth rollers can be cylindrical or crowned. Corrugated rollers can have various corrugation geometries, e.g. roof-shaped or trapezoid corrugation geometries, and/or can have segments placed on the circumferential surface. At least one roller, in particular both rollers of the grinding roller pair, in particular at least one grinding roller, in particular both grinding rollers of the grinding roller pair, can have a length in the range of 500 mm to 2000 mm and a diameter in the range of 250 mm to 300 mm.

The circumferential surface of the roller, in particular of the grinding roller, is preferably connected non-releasably to the roller body and is in particular formed integrally with it. This permits simple production and reliable and robust processing, in particular grinding, of the product.

The at least one sensor is designed to obtain measured values that characterize a state of at least one of the rollers, in particular of both rollers, of the roller pair. This can in particular be a state of a circumferential surface of at least one of the rollers, in particular of both rollers, of the roller pair. The state can be, for example, a temperature, a pressure, a force (force component(s) in one or more directions), a wear, a vibration, a deformation (stretching and/or deflection path), a rotational speed, a rotational acceleration, an environmental humidity, a position or an orientation of at least one of the rollers, in particular of both rollers, of the roller pair.

Thus, in contrast to the abovementioned prior art, at least one roller of the roller pair, in particular at least one grinding roller of the grinding roller pair, itself contains the at least one sensor. When the roller rotates during the operation, the sensor thus also rotates with it. In particular, the at least one sensor is arranged within a circumferential surface of the roller. Therefore, the at least one sensor is not located in the product space through which the product, in particular the material to be ground, also flows. A product-processing installation with at least one such roller, in particular a grinding installation with at least one such grinding roller, is thus much less susceptible to soiling. Moreover, the measurement can take place directly in the roller, which makes the measurement much more precise.

The sensor can be designed, for example, as an MEMS sensor (MEMS: Micro-Electro-Mechanical System).

The sensor preferably has a data connection to at least one data transmitter, which data transmitter is designed to transmit the measured values of the at least one sensor to a data receiver in a contact-free manner.

With the aid of the at least one data transmitter, the measured values can be transmitted in a contact-free manner to a data receiver, which is not a component part of the roller. It can in particular be a stationary data receiver, in relation to which the at least one sensor is moved during rotation of the roller. Due to the contact-free transmission, complicated rotary lead-throughs for cables can be avoided, which would otherwise be necessary.

Still more preferably, the data transmitter is arranged on or in the same roller as the sensor having the data connection thereto.

Advantageously, at least one roller, in particular both rollers, contains a plurality of sensors as described above, in particular at least two, preferably at least four, more preferably at least six sensors, which are contained in the roller. More preferably, a plurality of sensors have a data connection to the at least one data transmitter. The sensors can be arranged at different positions along a rotation axis of the roller and/or at different angles about this rotation axis. The more sensors the roller contains, and the more uniformly these are distributed, the more meaningful are the measured values obtained by them. The sensors are preferably arranged uniformly in the circumferential direction, as a result of which a rotation equilibrium is obtained.

At least one sensor can be designed as a temperature sensor, wherein a plurality of temperature sensors are preferably present which are arranged along a rotation axis of the roller in order to be able to determine a temperature profile along this direction;

a pressure sensor;

a force sensor (for determining the force component(s) in one or more directions);

a wear sensor;

a vibration sensor, in particular for determining a winding, i.e. an adherence of the processed product to the circumferential surface of the roller, which impedes processing, in particular grinding, at this position;

a deformation sensor (for determining a stretching and/or a deflection path);

a rotational speed sensor, in particular for determining a stoppage of the roller;

a rotational acceleration sensor;

a sensor for determining an environmental humidity, which sensor is preferably arranged on an end face of the roller;

a gyroscopic sensor for determining the position and/or the orientation of the roller, in particular for determining the position-dependent and/or orientation-dependent width of a gap between the two rollers of the roller pair, and the parallelism of the rollers;

a sensor for determining the width of a gap between the two rollers of the roller pair, in particular of a grinding gap between the two grinding rollers of the grinding roller pair, for example a sensor arranged in an end face of the roller, in particular an MEMS sensor.

Of course, any combinations of these are possible. For example, the roller can contain a plurality of temperature sensors and deformation sensors. Moreover, it is possible, and within the scope of the invention, that all the sensors are of the same type, for example are designed as temperature sensors. However, it is likewise possible, and within the scope of the invention, that at least one roller, in particular both rollers, contain(s) sensors of different types.

Here, and in the following, wear is understood as the mechanical attrition of the circumferential surface of the roller, in particular of the grinding roller. Such wear can be determined, for example, on the basis of a change of resistance, which change arises through removal of material from the circumferential surface. Alternatively or in addition, wear can be determined on the basis of an altered pressure and/or an altered path length and/or an altered electrical capacitance.

If one or both rollers contain(s) a plurality of sensors and also at least one data transmitter, it is preferable if the at least one data transmitter is designed for contact-free transmission of the measured values from a plurality of the sensors, more preferably from all of the sensors, to a data receiver. Preferably, at least one roller, in particular both rollers, each contains at most only a single data transmitter, particularly preferably exactly a single data transmitter, for the contact-free transmission of the measured values. The fewer data transmitters the roller contains, the simpler the structure of this roller.

Particularly if at least one roller contains only a single data transmitter, then this roller, in particular both rollers, preferably contains at least one multiplexer which is arranged and designed to alternately transmit the measured values obtained by the sensors to the data transmitter.

The contact-free transmission can be achieved, for example, by infrared radiation, by light pulses, by radio frequency signals, by inductive coupling or by any desired combination thereof.

Here and in the following, the contact-free transmission of the measured values always also comprises the transmission of data which are obtained through suitable processing of the measured values and which are thus based on the measured values. For example, at least one roller, in particular both rollers, can contain at least one signal converter, in particular at least one A/D converter, for converting the measured values obtained by the at least one sensor. In a first possible variant, each sensor can be assigned at least one signal converter, which converts the measured values obtained by this sensor. The converted signals can then be delivered to a multiplexer as already described above. If the signal converters are in the form of an A/D converter, the multiplexer can be a digital multiplexer. In a second possible variant, the signal converter can also be arranged between a multiplexer, as described above, and the data transmitter. In this case, the multiplexer can be an analog multiplexer.

Preferably, at least one roller, in particular both rollers, in particular a hereinbelow described roller body of at least one roller, in particular of both rollers, contains at least one power receiver and/or at least one power generator. It is thereby possible to power the at least one sensor and/or at least one multiplexer (in particular at least one multiplexer as described above) and/or at least one signal converter (in particular at least one signal converter as described above) and/or the at least one data transmitter (in particular the data transmitter contained on or in the roller) and/or at least one data transmitter of a measuring device described hereinbelow. It can in particular be an inductive power receiver. In this variant, the power receiver can, for example, have at least one reception coil, with the aid of which electromagnetic energy can be coupled in inductively. Alternatively or in addition, the power receiver can also be designed, however, to receive light energy. Alternatively or in addition, however, it is also possible, and within the scope of the invention, that at least one grinding roller, in particular both rollers, contain(s) at least one battery, in particular at least one rechargeable battery, with the aid of which said power supply can be achieved.

In one variant, the power generator can be designed to obtain power from the movement of the roller. For example, the power generator can be designed to obtain power from thermal differences within the roller, in particular utilizing thermoelectric effects, e.g. the Seebeck effect, Peltier effect or Thomson effect, for example with the aid of a thermal element, and/or vibrations of the roller, for example with the aid of at least one piezo element and/or mechanically, and/or the rotation of the roller, for example with the aid of at least one piezo element and/or mechanically.

Advantageously, the roller can contain both at least one power receiver and/or at least one power generator and also at least one rechargeable battery, which is rechargeable from the power receiver and/or power generator.

Advantageously, at least one roller, in particular both rollers, contains at least one printed circuit board (in particular an MEMS printed circuit board) on which the at least one sensor and/or at least one multiplexer (in particular at least one multiplexer as described above) and/or at least one signal converter (in particular at least one signal converter as described above) and/or the at least one data transmitter (in particular the data transmitter contained on or in the roller) and/or at least one power receiver (in particular at least one power receiver as described above) and/or at least one power generator (in particular at least one power generator as described above) are arranged. The printed circuit board can contain measurement lines via which the sensors are connected to the multiplexer. Such a printed circuit board has the advantage that said components can be arranged in a very compact manner thereon, and that the printed circuit board can be produced as a separate assembly and, at least in some illustrative embodiments, can be replaced as and when necessary.

As an alternative to a printed circuit board, however, the sensors can also be connected to the data transmitter and/or to the multiplexer via a cable harness.

In several embodiments, at least one roller, in particular both rollers, comprises a roller body with at least one receiving opening and at least one measuring device which is insertable or inserted into the receiving opening, in particular releasably. The circumferential surface of the roller body forms at least part of the circumferential surface of the roller, in particular the entire circumferential surface of the roller. The measuring device contains at least one of the sensors of the roller. Moreover, it can contain at least one multiplexer (in particular at least one multiplexer as described above) and/or at least one signal converter (in particular at least one signal converter as described above). This at least two-part structure of the roller likewise permits the production of separate assemblies. Particularly if the measuring device is inserted releasably in the receiving opening, it can easily be exchanged, for example if it has to be cleaned or serviced or is faulty.

In other embodiments, however, it may also be expedient if the measuring device is inserted non-releasably in the receiving opening. In this way, the measuring device can be connected more securely to the roller body. Moreover, it is possible to prevent unauthorized removal of the measuring device, which removal could compromise safety. The measuring device can, for example, be cast in the receiving opening (for example with the aid of a resin) or can be welded in. In this way, the risk of explosions can also be avoided, such that in particular the ATEX guidelines of the European Union can be met.

In some embodiments, the receiving opening can be formed principally by a cylindrical bore which can have a diameter in the range of 5 mm to 40 mm, preferably of 5 mm to 25 mm, particularly preferably of 10 mm to 14 mm. This bore can extend substantially parallel to a rotation axis of the roller body. To be able to determine the state of a circumferential surface, the receiving opening is preferably arranged in an outer area of the roller body. Thus, the receiving opening can be located, for example, in a cylindrical ring-shaped area of the roller body.

In advantageous embodiments, the receiving opening extends substantially along the entire length of the roller body in the direction of the rotation axis, that is to say along at least 50%, preferably at least 70%, particularly preferably at least 90% of the total length of the roller body. In this way, the state of the roller can also be determined substantially along the entire length thereof. The at least one receiving opening is preferably arranged such that a mass balance is taken into account, since in this way it is possible to dispense with balancing the roller. Alternatively, it is also possible for two or more receiving openings to be present which are preferably arranged uniformly in the circumferential direction; in this way too it is possible to dispense with balancing.

The measuring device can be rod-shaped and have a longitudinal axis along which a plurality of sensors, for example temperature sensors, are arranged.

In other embodiments, the receiving opening can be formed in a circumferential surface of the roller body. In particular, it can extend substantially in the radial direction of the roller body, that is to say substantially perpendicular to a rotation axis of the roller body. When a measuring device is inserted into a receiving opening of this kind, it is very easy to measure a state of the circumferential surface of the roller, for example a temperature prevailing on the circumferential surface.

Preferably, the roller body can contain both at least one radial receiving opening, which is formed in a circumferential surface of the roller body and in which at least one of the sensors is arranged, and also at least one axial receiving opening, i.e. a receiving opening which extends parallel to the rotation axis and in which the printed circuit board is arranged. The sensors can either be connected to the printed circuit board or designed in such a way, and arranged relative to the printed circuit board in such a way, that they can communicate with the latter in a contact-free manner, for example by ultrasound, infrared radiation, inductive coupling, radio frequency signals or any desired combination of these.

The measuring device can be designed as a bolt with a thread, and the receiving opening can have a mating thread into which the thread of the bolt can be screwed. Alternatively or in addition, the measuring device can be designed as a bolt with a first bayonet catch element, and the receiving opening can have a second bayonet catch element into which the first bayonet catch element of the bolt can be fitted. The first and/or the second bayonet catch element can have a safety means. Both variants permit particularly simple insertion of the measuring device into the receiving opening and, when necessary, simple removal thereof.

This embodiment as a bolt is particularly suitable when the bolt contains a sensor designed as a wear sensor, as a pressure sensor or as a temperature sensor.

Particularly preferably, the measuring device, in particular the bolt, has at least one further data transmitter and at least one further data receiver. In this case, the data transmitter of the measuring device and the data receiver are designed and arranged in such a way that the measurement data obtained by the sensor can be transmitted in a contact-free manner from the at least one further data transmitter to the at least one further data receiver. This is particularly advantageous if the measuring device can only be inserted releasably into the receiving opening, the reason being that no cable connections need to be set up during insertion, in particular no cable connections between the measuring device and the roller body.

The contact-free transmission from the further data transmitter to the further data receiver can take place in particular through an interior of the roller body, in particular through a cavity of the roller body. A transmission through a cavity is only marginally susceptible to interference and, moreover, requires only comparatively low transmission power. The contact-free transmission from the further data transmitter to the further data receiver can be effected, for example, by infrared radiation, by light pulses, by radio frequency signals, by inductive coupling or by any desired combination of these.

The measuring device, in particular the bolt, can be powered inductively and/or by light. Alternatively or in addition, the measuring device, in particular the bolt, can contain a power receiver as described above and/or a power generator as described above, which is designed to obtain power from the movement of the roller, for example from
  thermal differences within the roller, in particular utilizing thermoelectric effects, e.g. the Seebeck effect, Peltier effect or Thomson effect, for example with the aid of a thermal element, and/or
  vibrations of the roller, for example with the aid of at least one piezo element and/or mechanically, and/or
  the rotation of the roller, for example with the aid of at least one piezo element and/or mechanically.

Alternatively or in addition, it is likewise possible for the measuring device, in particular the bolt, to have at least one battery, in particular at least one rechargeable battery.

Alternatively or in addition to a data receiver integrated in the roller body, a product-processing installation containing the roller pair, in particular a grinding installation containing the grinding roller pair, can also have a data receiver which is arranged outside the roller. Such a data receiver can be rod-shaped and can in particular extend perpendicularly with respect to a rotation axis of the roller.

If a plurality of receiving openings are present, these can be arranged at various positions along a rotation axis of the roller body and/or at various angles about this rotation axis. The more uniformly the receiving openings are distributed, the more meaningful are the measured values obtained from the measuring devices fitted in these receiving openings. The receiving openings are preferably arranged uniformly in the circumferential direction, as a result of which a rotation equilibrium is obtained, such that balancing, which would otherwise be required, can be dispensed with.

The at least one data transmitter (in particular the at least one data transmitter of one or both of the rollers or the abovementioned further data transmitter) and/or the data receiver (in particular the data receiver of the roller body of said roller(s)) and/or the power receiver and/or the power generator are preferably arranged on an end face of said roller(s), in particular on an end face of a roller body of said roller(s). On such an end face, the contact-free transmission of the measured values is impeded very little, if at all, by the product being ground with the roller.

In one embodiment, a printed circuit board as already described above can be a component part of the measuring device. The at least one sensor and/or at least one multiplexer (in particular at least one multiplexer as described above) and/or at least one signal transmitter (in particular at least one signal transmitter as described above) can be arranged on this measuring device.

The roller can contain at least one data memory, in particular an RFID chip. For example, an in particular individual identification of the roller is stored or can be stored in this data memory. Alternatively or in addition, at least one property of the roller is stored or can be stored in the data memory, for example at least one of its dimensions and/or its crowning. The data stored in the data memory are preferably likewise transmitted in a contact-free manner. For this purpose, the roller can have a data transmitter. It is conceivable here that the data of the data memory are transmitted by the same data transmitter with which, according to the invention, the measured values of the at least one sensor are transmitted.

A further aspect of the invention relates to a measuring device for in particular releasable insertion into a receiving opening of a roller body of a roller of a roller pair. In particular, the receiving opening can be formed in a circumferential surface of the roller body. The roller can be a grinding roller of a grinding roller pair as described above, and the roller body can be the roller body of such a grinding roller.

According to the invention, the measuring device has at least one sensor for obtaining measured values that characterize a state of the roller, in particular a state of a circumferential surface of the roller. Moreover, the measuring device according to the invention can have at least one data transmitter for transmitting the measured values to a data receiver in particular in a contact-free manner. In a first variant, the data can be transmitted to a stationary data receiver as described above. In a second variant, however, the data can also be transmitted to a likewise above-described data receiver, in particular to a further data receiver as described above or to a data receiver of the roller body.

The measuring device can also contain a data processor integrated therein, in particular a microprocessor, an FPGA, a PLC processor or an RISC processor. This data processor can, for example, further process the measured values obtained by the at least one sensor and then optionally transmit them to the data transmitter, in particular if the latter is contained in the roller. In particular, the data processor can wholly or partly take over the function of the above-described multiplexer and/or of the above-described signal converter. The microprocessor can be a component part of the printed circuit board likewise described above. Alternatively or in addition, the microprocessor can also take over at least one of the following functions: communication with at least one data bus system (in particular management of IP addresses); printed circuit board memory management; control of energy management systems in particular as described below; management and/or storage of identification features of the roller(s), for example geometric data and roller history; management of interface protocols; wireless functionalities.

Furthermore, the measuring device, in particular the printed circuit board, can have an energy management system which can perform one, several or all of the following functions:
regular, in particular periodic transmission of the measured values from the data transmitter;
transmission of the measured values from the data transmitter only when a predefined condition arises, in particular when an alarm criterion as described below is satisfied;
regular, in particular periodic charging and discharging of a capacitor or of an energy store.

The product-processing installation for processing a product, in particular the grinding installation for grinding of grindable material, contains at least one roller pair as described above, in particular a grinding roller pair. A gap is formed between the rollers of the roller pair. In particular, a grinding gap is formed between the grinding rollers of a grinding roller pair. Within the context of the invention, only one of the two rollers of the roller pair has to be designed according to the invention; the invention, however, also covers embodiments in which both rollers of the roller pair are designed according to the invention, i.e. contain at least one sensor as described above and, optionally, at least one data transmitter as described above. Particularly during the grinding of grindable material, this grindable material is guided substantially vertically downward through such a grinding gap. Moreover, particularly during the grinding of grindable material, this grindable material is preferably delivered to the grinding rollers by means of its force of gravity, and this delivery can optionally be assisted pneumatically. The product, in particular the bulk material, in particular the material to be ground, can be granular and can move as a fluid stream through the grinding gap.

In some embodiments, particularly in the refining of masses such as chocolate masses or sugar masses, this mass can alternatively also be delivered from below upward through the gap formed between the rollers.

The measuring device can have one, several or all of the features already described above and can afford the resulting advantages likewise described above. In particular, the measuring device can
contain at least one signal converter, and/or
be designed as a bolt with a thread which can be screwed into a mating thread of the receiving opening of the roller body, and/or
be designed as a bolt with a first bayonet catch element which can be fitted into a second bayonet catch element of the receiving opening of the roller body, and/or
contain at least one printed circuit board on which the at least one sensor and/or at least one multiplexer and/or at least one signal converter are arranged, and/or
contain at least one sensor which is designed as a temperature sensor, wherein a plurality of temperature sensors are preferably present which are arranged along a rotation axis of the roller in order to be able to determine a temperature profile along this direction, and/or contain at least one sensor which is designed as a pressure sensor, and/or contain at least one sensor which is designed as a force sensor (for determining the force component(s) in one or more directions), and/or contain at least one sensor which is designed as a wear sensor, and/or contain at least one sensor which is designed as a vibration sensor, in particular for determining a winding, i.e. an adherence of the processed product to the circumferential surface of the roller, which impedes processing, in particular grinding, at this position, and/or contain at least one sensor which is designed as a deformation sensor (for determining a stretching and/or a deflection path), and/or contain at least one sensor which is designed as a rotational speed sensor, in particular for determining a stoppage of the roller, and/or contain at least one sensor which is designed as a rotational acceleration sensor, and/or contain at least one sensor which is designed for determining an environmental humidity and which is preferably arranged on an end face of the roller, and/or contain at least one sensor which is designed as a gyroscopic sensor for determining the position and/or the orientation of the roller, in particular for determining the position-dependent and/or orientation-dependent width of a gap between the two rollers of the roller pair, and the parallelism of the rollers, and/or contain at least one sensor for determining the width of a gap between the two rollers of the roller pair, in particular of a grinding gap between the two grinding rollers of the grinding roller pair, for example a sensor arranged in an end face of the roller, in particular an MEMS sensor.

The measuring device can have, at or outside at least one end opening of the receiving opening, at least one data transmitter for in particular contact-free transmission of the measured values to a data receiver.

A further aspect of the invention relates to a product-processing installation, in particular a grinding installation for the grinding of grindable material. The product-processing installation according to the invention contains at least one roller pair as described above. In addition, the product-processing installation can have at least one in particular stationary data receiver for receiving the measured values transmitted from the data transmitter of at least one of the rollers, in particular both rollers, of the roller pair. The advantages already described above can be achieved with such a product-processing installation. Particularly if the grinding installation contains a plurality of different roller pairs to which the product is delivered from the same product inlet, it may be advantageous if only one of the roller pairs is designed according to the invention.

The grinding installation can be, for example, an individual roller mill of a flour mill, or also a complete flour mill with at least one roller mill, wherein at least one roller mill contains at least one grinding roller as described above. However, the product-processing installation can also be:

a flaking roller mill for the flaking of bulk material, in particular cereal, cereal milling products and cereal end products in the milling industry or special milling industry as mentioned above;

a roller mill for the production of chocolate, in particular a preliminary roller mill with, for example, two or five rollers, in particular two or five fine rollers, or a finishing fine roller mill;

a roller mill for wet grinding and/or dispersing, for example of printing inks, coatings, electronic materials or chemicals, in particular fine chemicals, in particular a three-roller mill.

A further aspect of the invention is directed to a method for operating a product-processing installation as described above, in particular a grinding installation as described above. The method comprises a step in which measured values transmitted by a data transmitter of at least one of the rollers, in particular both rollers, of the roller pair are received by the data receiver of the product-processing installation.

The data thus received can then be further processed and evaluated. For this purpose, they can be delivered to a control unit of the product-processing installation, in particular of the grinding installation, from where they can be forwarded to an optional higher-level management system. With the aid of the control unit and/or of the management system, the entire product-processing installation, in particular the entire grinding installation, or a part thereof, can be open-loop controlled and/or closed-loop controlled.

In particular, the control unit can output an alarm if a predefined alarm criterion is met. For example, the alarm criterion can be that the measured value of at least one of the sensors exceeds a limit value predefined for this sensor. In another variant, the alarm criterion can be that the difference between the highest measured value and the lowest measured value, which are measured by a predefined number of sensors, exceeds a predefined limit value.

If the alarm criterion is met, an alarm signal can be output (for example optically and/or acoustically) and/or the product-processing installation can be brought to a stop (for example by the control unit). Moreover, the control unit can visualize the measured values obtained from the at least one sensor or can visualize data extracted from these measured values.

Downstream from the roller pair according to the invention, the product-processing installation can contain at least one device for measuring particle sizes and their distributions. In this way, the measurement of the particle sizes and their distributions can be combined, for example, with a measurement of the state of wear and/or of the contact pressure of the rollers. This is particularly advantageous if the roller, in particular the grinding roller, is a corrugated roller. Alternatively or in addition, a device for NIR measurement of the flow of product, in particular of the flow of the material to be ground, can also be arranged downstream from the roller according to the invention, in particular from the grinding roller according to the invention. This is particularly advantageous if rollers, in particular the grinding rollers, are smooth rollers. As a result of the identification of the state of wear, both variants permit early planning of maintenance work.

A further aspect of the invention relates to a method for converting and/or upgrading at least one roller body, in particular both roller bodies, of a roller pair for processing a product, with at least one receiving opening for a measuring device, in particular a roller body as described above. In particular, the roller body can be the roller body of a grinding roller. The method contains a step in which a measuring device, in particular a measuring device as described above, is inserted into the receiving opening, such that a roller pair as described above is obtained.

BRIEF DESCRIPTION OF SEVERAL VIEWS OF THE DRAWINGS

The invention is explained in more detail below with reference to illustrative embodiments and drawings. In the drawings.

FURTHER DETAILED DESCRIPTION OF THE INVENTION

Figure 1:
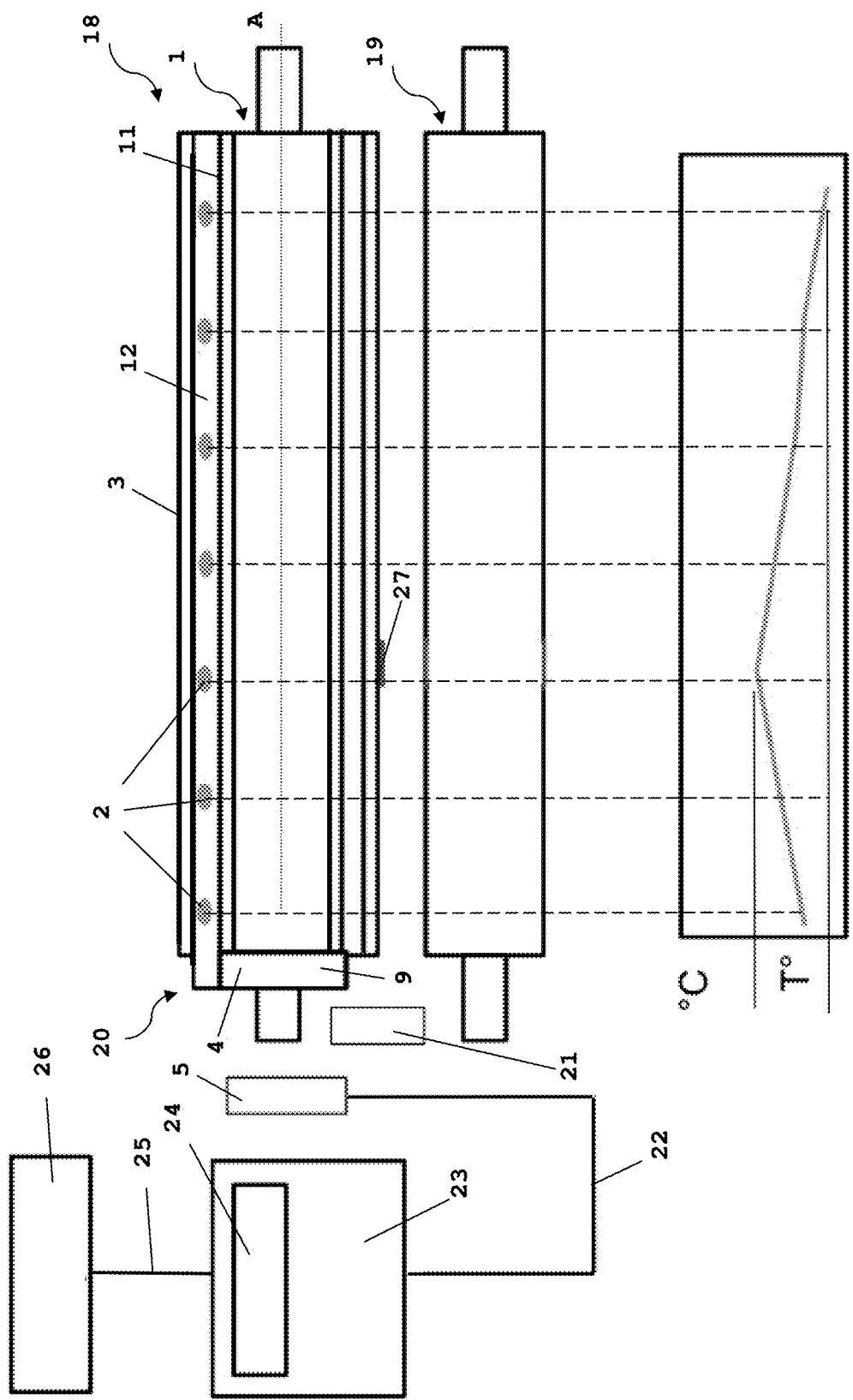
FIG. 1 shows a schematic view of a first grinding installation with a grinding roller and a plurality of temperature sensors.
Figure 2:
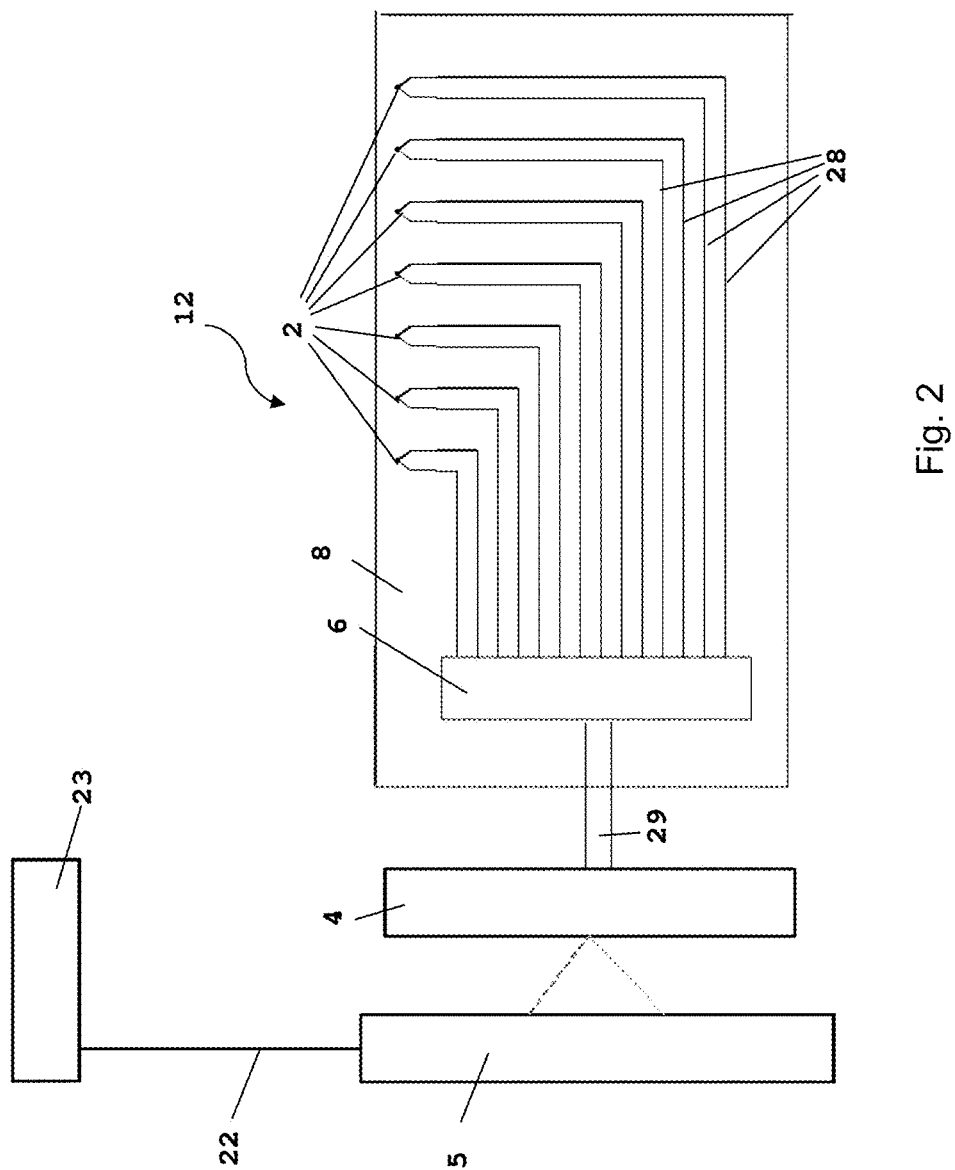
FIG. 2 shows a further schematic view of the grinding installation according to FIG. 1.

FIG. 1 shows a first product-processing installation according to the invention which is designed as a grinding installation 18 for the grinding of grindable material, in particular for the grinding of grain. The grinding installation 18 contains a grinding roller pair composed of a first grinding roller 1 with seven temperature sensors 2 and a data transmitter 4, and also a second grinding roller 19, although the latter does not necessarily have to contain a sensor or a data transmitter. The first grinding roller 1 contains a roller body 10 with a receiving opening 11 in the form of a cylindrical bore, which extends parallel to a rotation axis A of the roller body 10 and along the entire length thereof. A rod-shaped measuring device 12, which contains the seven temperature sensors 2, is inserted into the receiving opening 11. The measuring device 12 is cast in the receiving opening 11 and is thereby inserted non-releasably in the receiving opening 11. With the aid of the temperature sensors 2, measured values can be obtained that characterize the temperature at different locations of a circumferential surface 3 of the grinding roller 1. The structure of the measuring device 12 is described in greater detail below with reference to FIGS. 2 and 3*a* to 3*d*.

On an end face 20, the grinding roller 1 has the data transmitter 4 which co-rotates during the rotation operation and by which the measured values of the temperature sensors 2 are transmitted in a contact-free manner to a stationary data receiver 5. The contact-free transmission of the measured values can be achieved by infrared radiation, by light pulses, by radio frequency signals, by inductive coupling or by any desired combination thereof. On its end face 20, the grinding roller 1 moreover has an inductive power receiver 9 by which power from a magnet 21 can be coupled in inductively.

The data received by the data receiver 5 are forwarded via a line 22 to a control unit 23, with the aid of which the entire grinding installation 18 or a part thereof can be controlled and/or regulated. The control unit 23 contains display means 24, for example a screen, by means of which the measured values obtained from the temperature sensors 2, or data extracted therefrom, can be visualized. Moreover, the control unit 23 can output an alarm if a predefined alarm criterion is met, for example if the temperature measured by one of the temperature sensors 2 exceeds a predefined limit value. By way of a further line 25, the data can be forwarded to an optional higher-level management system 26.

The lower part of FIG. 1 is a schematic view of the temperature profile, in the way in which it could be presented by the display means 24 of the control unit 23. If, for example, there is a dry run at the position 27 of the grinding roller 1, the temperature rises locally in this area, which can be an indication of possible ignition. On account of the large number of temperature sensors 2, the position 27 can be precisely located, and countermeasures can be taken.

FIG. 2 shows, once again schematically, how the measured values are transmitted from the seven temperature sensors 2 to the control unit 23. The measuring device 12 contains a printed circuit board 8, on which the seven temperature sensors 2 and a multiplexer 6 are arranged. Each of the temperature sensors 2 is connected to the multiplexer 6 via two measurement lines 28 in each case. The multiplexer 6 alternately transmits the measured values obtained from the temperature sensors 2 via a cable 29 to the data transmitter 4, which then transmits the measured values to the data receiver 5 in a contact-free manner.

FIGS. 3*a* to 3*d* show several photographic detailed views of the measuring device 12. The printed circuit board 8 and the multiplexer 6 can be seen in FIG. 3*a*.

Figure 3A:
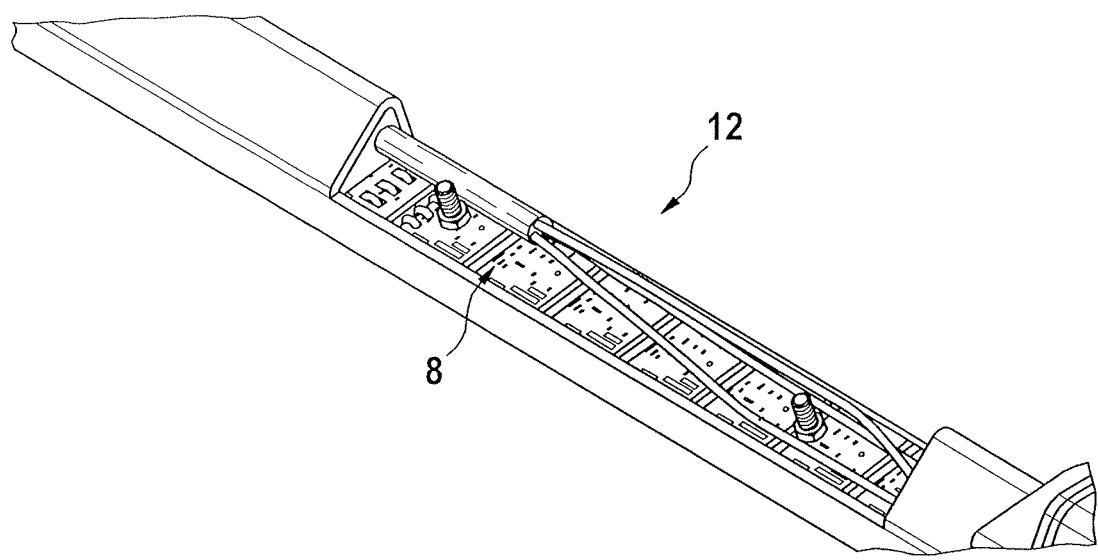
FIGS. 3*a-d* show four photos with detailed views of a measuring device contained in the grinding roller as per FIG. 1.
Figure 3B:
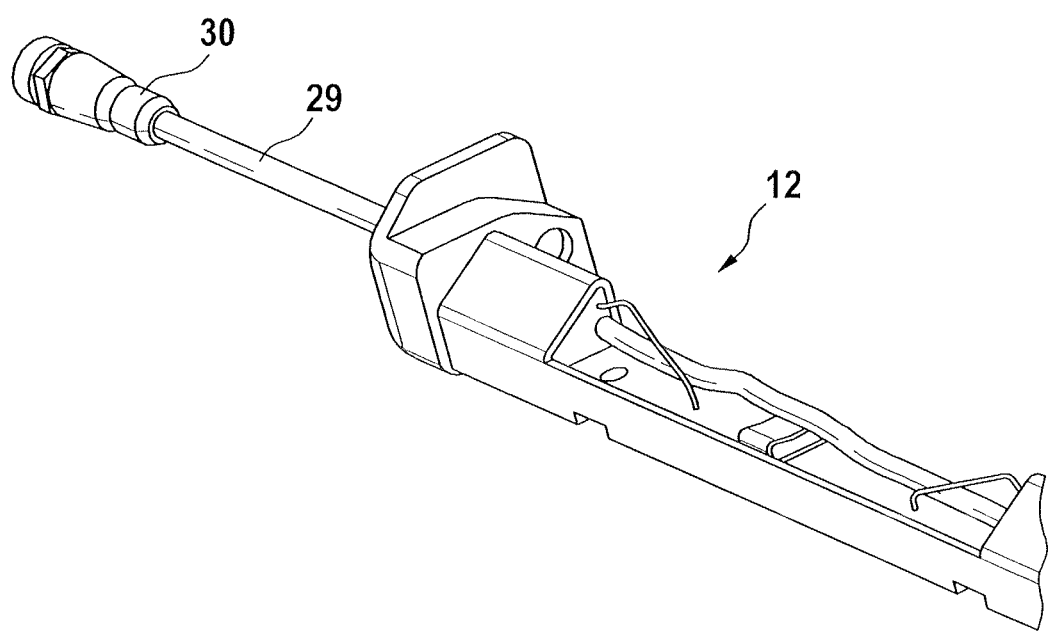

In FIG. 3*b*, an end of the measuring device 12 is visible from which the cable 29 emerges. At the end of this cable 29 there is a plug 30, with which the measuring device 12 can be connected to the data transmitter 4.

Figure 3C:
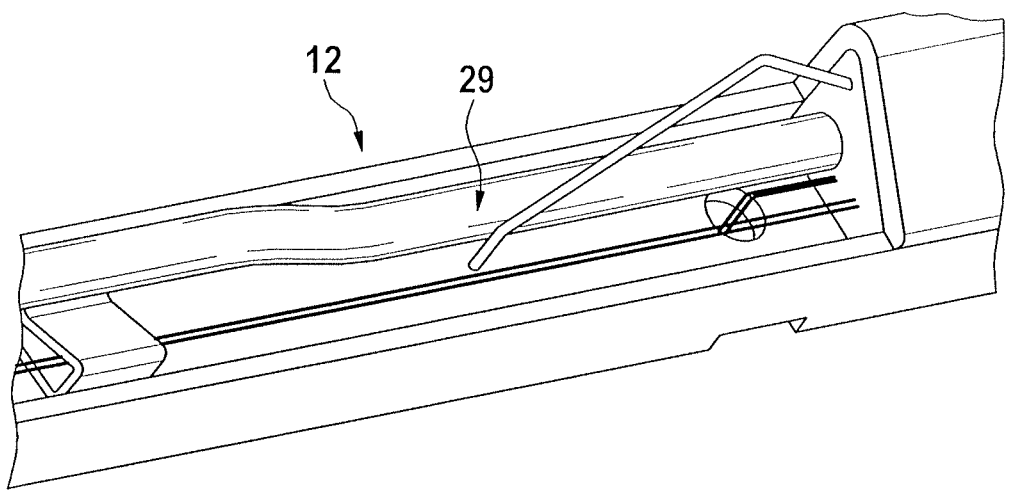

FIG. 3*c* contains a further detailed view of the end of the measuring device 12 already shown in FIG. 3*b*.

Figure 3D:
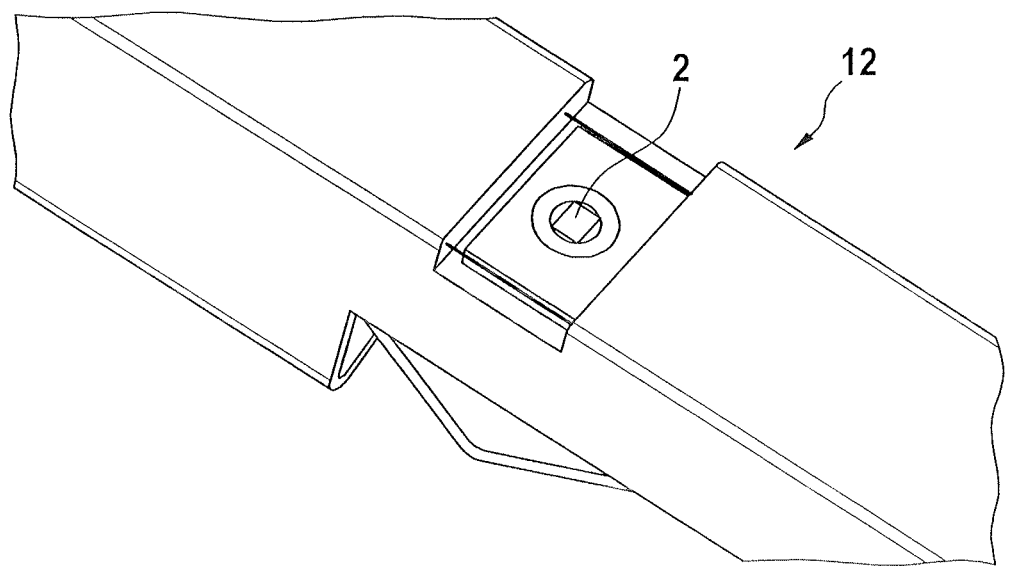

FIG. 3*d* shows a rear view of the part of the measuring device 12 depicted in FIG. 3*c*, in which one of the temperature sensors 2 can be seen. For example, the temperature sensors 2 can be of the PT 1000 type, which is known per se.

Figure 4:
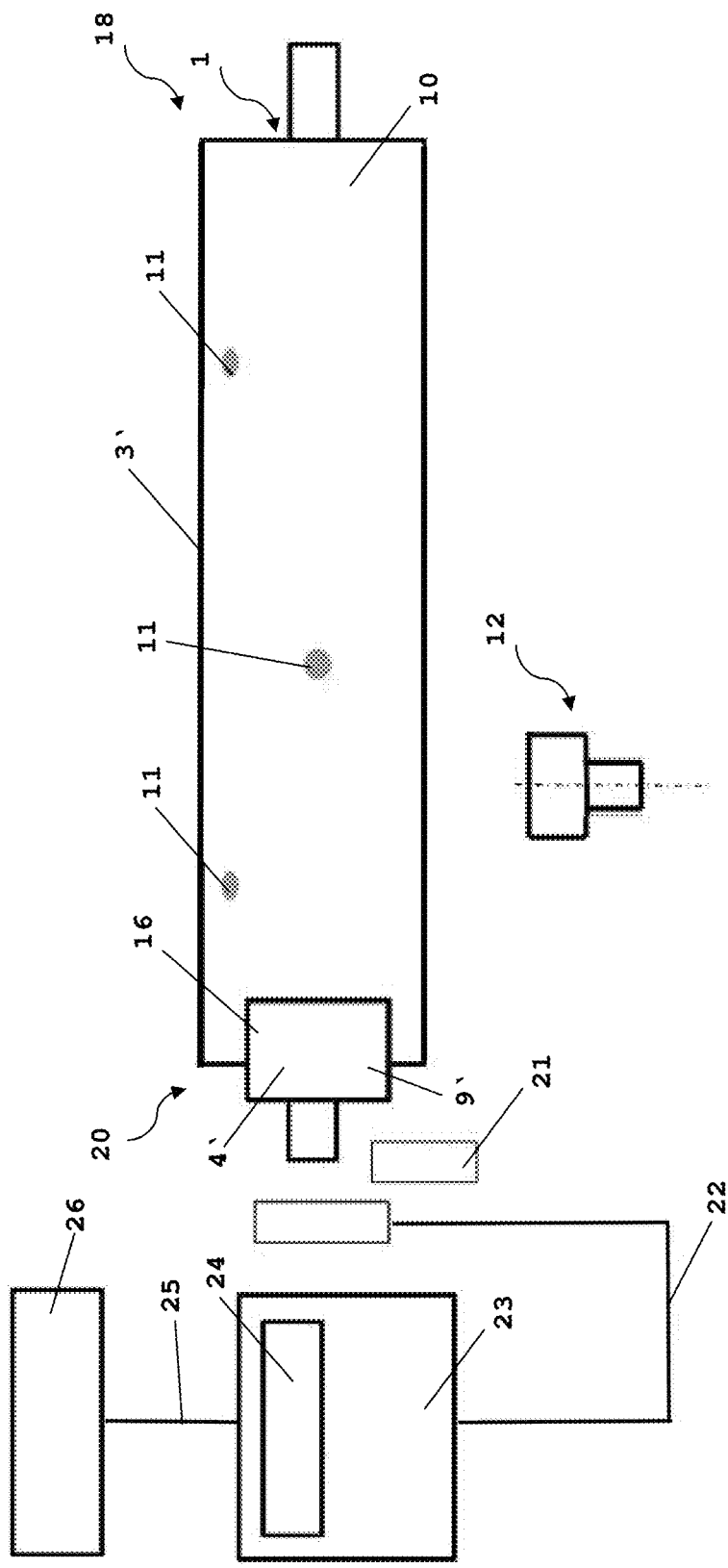
FIG. 4 shows a second illustrative embodiment, according to the invention, of a grinding installation with a grinding roller having a plurality of pressure sensors.

FIG. 4 shows schematically a second embodiment of a product-processing installation according to the invention, which is likewise designed as a grinding installation 18' for the grinding of grindable material, in particular grain. To simplify the view, only one grinding roller 1' of a roller pair is shown here, not a further grinding roller 19 as in FIG. 1. Several receiving openings 11' are present in a circumferential surface 3' of a roller body 10' of the grinding roller 1', of which receiving openings only 3 are shown here. These receiving openings 11' extend in the radial direction of the roller body 10', that is to say perpendicular to a rotation axis A' of the roller body 10'.

A bolt 12', which constitutes a measuring device, is also shown (not to scale) in FIG. 4. This bolt 12' contains a thread (not shown in the figure). Each of the receiving openings 11' has a mating thread (likewise not shown) into which the bolt 12' can be screwed. The bolt 12' moreover has a sensor and a data transmitter, neither of which is shown in FIG. 4. For example, the sensor can be a wear sensor, a pressure sensor or a temperature sensor.

A data transmitter 4', a power receiver 9' and a data receiver 16' are arranged on an end face 20' of the grinding roller 1'. The measurement data obtained from the sensor 2' can in this way be transmitted in a contact-free manner from the data transmitter of the bolt 12' to the data receiver 16' of the roller body 1', for example by infrared radiation, by light pulses, by radio frequency signals, by inductive coupling or by any desired combination thereof. This is preferably done through an interior, in particular a cavity of the roller body 10'.

The bolt 12' can be powered inductively and/or by light. Alternatively or in addition, it can contain at least one piezo element, by means of which electrical energy can be generated from the forces that arise upon rotation of the grinding roller 1'. It is likewise possible, alternatively or in addition, for the bolt 12' to have at least one battery, in particular at least one rechargeable battery.

Furthermore, the following aspects are disclosed:

A. A grinding roller (1; 1'), containing
- at least one sensor (2; 2'), preferably a plurality of sensors (2; 2') for obtaining measured values that characterize a state of the grinding roller (1; 1'), in particular a state of a circumferential surface (3, 3') of the grinding roller (1; 1');
- at least one data transmitter (4; 4'), preferably a single data transmitter (4; 4'), for transmitting the measured values of the at least one sensor (2; 2'), preferably of a plurality of the sensors (2; 2'), more preferably of all the sensors (2; 2'), to a data receiver (5; 5') in a contact-free manner.

B. The grinding roller (1; 1') as per feature combination A, wherein it contains at least one multiplexer (6; 6') which is arranged and designed to alternately transmit the measured values obtained by the sensors (2; 2') to the data transmitter (4; 4').

C. The grinding roller (1; 1') as per one of the preceding feature combinations, wherein it contains at least one signal converter (7; 7'), in particular at least one A/D converter (7; 7'), for converting the measured values obtained by the sensor (2; 2').

D. The grinding roller (1; 1') as per one of the preceding feature combinations, wherein it contains at least one power receiver (9; 9') for powering the sensor (2; 2') and/or at least one multiplexer (6; 6') and/or at least one signal converter (7; 7') and/or the data transmitter (4; 4') of the grinding roller (1; 1') and/or the data transmitter of a measuring device (12, 12'), in particular at least one inductive power receiver (9; 9').

E. The grinding roller (1; 1') as per one of the preceding feature combinations, wherein it contains at least one printed circuit board (8; 8') on which the sensor (2; 2') and/or at least one multiplexer (6; 6') and/or at least one signal converter (7; 7') and/or the at least one data transmitter (4; 4') of the grinding roller (1; 1') and/or at least one power receiver (9; 9') are arranged.

F. The grinding roller (1; 1') as per one of the preceding feature combinations, wherein it comprises a roller body (10; 10') with at least one receiving opening (11; 11') and at least one measuring device (12; 12') which is insertable or inserted into the receiving opening (11; 11'), in particular releasably, which measuring device (12; 12') contains at least one of the sensors (2; 2').

G. The grinding roller (1') as per feature combination F, wherein the receiving opening (11') is formed in a circumferential surface (3') of the roller body (10').

H. The grinding roller (1') as per one of feature combinations F and G, wherein the measuring device (12') is designed as a bolt (12') with a thread (13'), and the receiving opening (11') has a mating thread (14') into which the thread (13') of the bolt (12') can be screwed.

I. The grinding roller (1') as per one of feature combinations F to H, wherein the measuring device (12') has at least one data transmitter and the roller body (10') has at least one data receiver (16'), which are designed and arranged in such a way that the measurement data obtained by the sensor (2') can be transmitted in a contact-free manner from the data transmitter of the measuring device (12') to the data receiver (16') of the roller body (10'), in particular through an interior (17') of the roller body (10'), in particular through a cavity (17') of the roller body (10').

J. The grinding roller (1; 1') as per one of the preceding feature combinations, wherein the measuring device (12; 12') contains at least one printed circuit board (8; 8') on which the at least one sensor (2; 2') and/or at least one multiplexer (6; 6') and/or at least one signal converter (7; 7') are arranged.

K. The grinding roller (1; 1') as per one of the preceding feature combinations, wherein at least one sensor (2; 2') is designed as a temperature sensor (2) and/or at least one sensor (2; 2') is designed as a pressure sensor (2') and/or at least one sensor is designed as a force sensor and/or at least one sensor is designed as a wear sensor and/or at least one sensor is designed as a vibration sensor and/or at least one sensor is designed as a deformation sensor.

L. A measuring device (12') for in particular releasable insertion into a receiving opening (11') of a roller body (10') of a grinding roller (1'), in particular of a grinding roller (1') as per one of feature combinations F to K, wherein the measuring device (12') has at least one sensor (2') for obtaining measured values that characterize a state of the grinding roller (1'), in particular a state of a circumferential surface (3') of the grinding roller (1'), and in particular at least one data transmitter for transmitting the measured values to a data receiver (5'; 16') in particular in a contact-free manner.

M. A grinding installation (18; 18') containing at least one grinding roller (1; 1') as per one of feature combinations A to K and at least one data receiver (5; 5') for receiving the measured values transmitted by the data transmitter (4; 4') of the grinding roller (1; 1').

N. A method for operating a grinding installation (18; 18') as per feature combination M, comprising a step in which measured values transmitted by a data transmitter (4; 4') of the grinding roller (1; 1') are received by the data receiver (5; 5') of the grinding installation (18, 18').

O. A method for converting and/or upgrading a roller body (10; 10') with at least one receiving opening (11; 11') for a measuring device (12; 12'), containing a step in which a measuring device (12; 12'), in particular a measuring device (12; 12') as per feature combination L, is inserted into the receiving opening (11; 11'), such that a grinding roller (1; 1') as per one of feature combinations F to K is obtained.

The invention claimed is:

1. A grinding roller pair for processing a product, containing a first grinding roller and a second grinding roller, wherein
said first grinding roller contains at least one co-rotating sensor which co-rotates, during operation, with the first grinding roller and which obtains measured values that characterize a state of a circumferential surface of at least said first grinding roller;
the co-rotating sensor has a data connection to at least one co-rotating first data transmitter co-rotating during operation with the first grinding roller, which co-rotating first data transmitter is capable of transmitting the measured values of the at least one co-rotating sensor to a first data receiver in a contact-free manner; and
the co-rotating first data transmitter is provided on or in the same first grinding roller as the co-rotating sensor having the data connection thereto;
wherein the first grinding roller comprises a grinding roller body with at least one receiving opening and at least one measuring device which is inserted into the receiving opening, which measuring device contains at least one of the co-rotating sensors;

at least one of the at least one receiving openings extends parallel to a rotation axis of the grinding roller body and along the entire length of the grinding roller body and is arranged in an outer area of the grinding roller body; and at least one of the co-rotating sensors is selected from the group consisting of a temperature sensor, a pressure sensor, a force sensor, a vibration sensor, a rotational speed sensor, a rotational acceleration sensor, and a gyroscopic sensor.

2. The grinding roller pair according to claim 1, wherein the co-rotating first data transmitter is arranged on an end face of the first grinding roller.

3. The grinding roller pair according to claim 1, wherein a plurality of said co-rotating sensors are present which have a data connection to the at least one co-rotating first data transmitter.

4. The grinding roller pair according to claim 1, wherein the first grinding roller contains at least one multiplexer which is capable of alternately transmitting the measured values obtained by the co-rotating sensors to the co-rotating first data transmitter.

5. The grinding roller pair according to claim 1, wherein the first grinding roller contains at least one signal converter for converting the measured values obtained by the co-rotating sensor.

6. The grinding roller pair according to claim 1, wherein the first grinding roller contains at least one power receiver.

7. The grinding roller pair according to claim 1, wherein said first grinding roller contains at least one printed circuit board on which there is provided at least one component selected from the group consisting of the co-rotating sensor, the at least one multiplexer, the at least one signal converter, the at least one co-rotating first data transmitter, the at least one power receiver, the at least one power generator.

8. The grinding roller pair according to claim 1, wherein at least one of the at least one receiving openings is formed in a circumferential surface of the grinding roller body.

9. The grinding roller pair according to claim 8, wherein said at least one measuring device is a bolt with a thread, and the receiving opening formed in a circumferential surface of the grinding roller body has a mating thread into which the thread of the bolt is screwed, during operation.

10. The grinding roller pair according to claim 1, wherein said at least one measuring device has at least one second data transmitter and at least one second data receiver, wherein said second data transmitter and said second data receiver are capable of transmitting the measurement data obtained by the co-rotating sensor in a contact-free manner from the second data transmitter to the second data receiver.

11. A measuring device for insertion into the receiving opening of the grinding roller body of the first grinding roller of the grinding roller pair according to claim 1, for processing a product, which measuring device has a printed circuit board and at least one of the co-rotating sensors.

12. A product-processing installation containing at least one grinding roller pair according to claim 1.

13. A method for operating a product-processing installation according to claim 12, comprising a step in which measured values transmitted by the co-rotating first data transmitter of said first grinding roller of the grinding roller pair are received by the first data receiver of the product-processing installation.

14. A method for converting or upgrading at least one grinding roller body of a grinding roller pair for processing a product, containing a step in which the measuring device according to claim 11 is inserted into a receiving opening in the grinding roller body which extends parallel to a rotation axis of the grinding roller body.

15. The measuring device according to claim 11, wherein the measuring device is rod-shaped and has a longitudinal axis along which a plurality of sensors are arranged.

16. The grinding roller pair according to claim 1, wherein the first grinding roller contains at least one power generator for powering the co-rotating sensor.

17. The grinding roller pair according to claim 10, wherein said second data transmitter and said second data receiver are capable of transmitting the measurement data obtained by the co-rotating sensor in a contact-free manner from the second data transmitter to the second further data receiver through an interior cavity of the grinding roller body.

* * * * *